(12) United States Patent
Davidyan

(10) Patent No.: US 7,493,683 B2
(45) Date of Patent: Feb. 24, 2009

(54) METHOD OF DISASSEMBLING AN AUTOMOBILE

(76) Inventor: Robert Davidyan, 571 W. Scott St., Rialto, CA (US) 92376

( * ) Notice: Subject to any disclaimer, the term of this patent is extended or adjusted under 35 U.S.C. 154(b) by 564 days.

(21) Appl. No.: 11/058,404

(22) Filed: Feb. 14, 2005

(65) Prior Publication Data

US 2005/0193541 A1    Sep. 8, 2005

Related U.S. Application Data

(60) Provisional application No. 60/544,613, filed on Feb. 13, 2004.

(51) Int. Cl.
*B23P 19/04* (2006.01)
(52) U.S. Cl. .................... 29/426.1
(58) Field of Classification Search .......... 29/426.1, 29/426.3, 407.08, 705, 403.1, 403.3; 100/35, 100/901
See application file for complete search history.

(56) References Cited

U.S. PATENT DOCUMENTS

| | | | |
|---|---|---|---|
| 4,037,302 | A | 7/1977 | Hollander |
| 5,335,406 | A | 8/1994 | Van Den Mosselaar et al. |
| 6,594,877 | B2 | 7/2003 | Mori et al. |

| | | | | |
|---|---|---|---|---|
| 2001/0035102 | A1* | 11/2001 | Mori et al. | 100/35 |

FOREIGN PATENT DOCUMENTS

| | | | |
|---|---|---|---|
| DE | 36 40 501 | A1 | 9/1988 |
| DE | 101 07 033 | A1 | 9/2002 |
| FR | 2 760 389 | A | 9/1998 |
| JP | 11 078810 | A | 3/1999 |
| JP | 2002 283151 | A | 10/2002 |

OTHER PUBLICATIONS

Hendrix, Joerg et al., *International Journal of Environmentally Conscious Design and Manufacturing*, "Technologies for the Identification, Separation and Recycling of Automotive Plastics," Mar. 1996.
"Automotive Recycling Industry," Chapter 2, pp. 4-7.
"Vehicle Dismantling Manual 2002, Cadillac Seville," Jan. 2002.

* cited by examiner

*Primary Examiner*—John C Hong
(74) *Attorney, Agent, or Firm*—Knobbe, Martens, Olson & Bear LLP

(57) ABSTRACT

A suspended automobile disassembly line that does not utilize any hydraulically operated equipment is provided. The disassembly line utilizes a plurality of electrically operated lift system to stabilize and suspend an automobile while at various stages of disassembly. Since the automobile is suspended throughout the disassembly line, human handling is reduced and efficiency of the disassembly process is improved. The lift system includes a plurality of grabber arms that provide a wide range of motion adapted to move and tilt a vehicle into various positions during disassembly.

7 Claims, 17 Drawing Sheets

METHOD OF DISASSEMBLING AN AUTOMOBILE

RELATED APPLICATIONS

This application claims the benefit of U.S. Provisional Patent Application No. 60/544,613, filed on Feb. 13, 2004, which is incorporated by reference in its entirety.

BACKGROUND OF THE INVENTION

1. Field of the Invention

The present invention relates generally to a method and apparatus for dismantling automobiles, and more particularly, to a suspended automobile disassembly line adapted to dismantle automobiles and recover recyclable part and materials.

2. Description of the Related Art

Scrapped automobiles are typically disassembled for recycling and salvage of various parts. After the reusable parts are removed from the automobile, the remaining parts are crushed and pressed as iron scrap. In a typical disassembly process, an auto dismantler removes battery, tires, oils and other fluids and hazardous materials from the car before sending the hulk of the car to a crusher such as glass, plastics, rubber, carpet which can end up in landfills as fluff or crushed residue.

In a conventional scrap yard, the disassembly process typically takes place while the car remains in one area and often involves a very inefficient and disorganized process. Moreover, the dismantling activities are usually very labor intensive and messy. Additionally, vehicle fluid leakage from the dismantled cars often create a hazardous working condition and is one of the primary causes of accidents in scrap yards. In some cases when fluids are not completely removed from the car, leakage can also occur when the vehicle is tilted or lifted.

Various automobile disassembly lines have been developed to stream line the disassembly process and address some of the above-described problems associated with the conventional dismantling operations. For example, U.S. Pat. No. 5,335,406 discloses a dismantling line which includes a device for rotating the automobile so as to facilitate removal of parts located on the bottom of the vehicle. However, this system requires the use of complicated, hydraulically operated equipment, which can create various maintenance and safety issues. Similarly, U.S. Pat. No. 6,594,877 provides a dismantling line that is focused on increasing the percentage of parts recycled but requires the use of complex hydraulic devices, which can increase the maintenance cost. U.S. Pat. No. 4,037,302 discloses a disassembly line that utilizes a conveyor belt for transporting vehicles while sequentially removing selected used parts. However, the conveyor belt is not designed to provide adequate access to the bottom of the vehicle.

Hence, in view of the foregoing, it will be appreciated that there is a need for an improved automobile disassembly system and process. To this end, there is a particular need for an automobile disassembly line that improves process efficiency and safety, reduces human handling of the car and required equipment maintenance.

SUMMARY OF THE INVENTION

In one aspect, the preferred embodiments of the present invention provide an automobile disassembly line. The disassembly generally includes a lift system configured to keep an automobile in a suspended position while the automobile is being disassembled. In one embodiment, the lift system is capable of stabilizing the automobile and tilting the automobile to its side so as to expose its lower side for parts to be removed therefrom. The lift system preferably comprises a plurality of grabber arm assemblies. The disassembly line further includes a track adapted to move the grabber arm assemblies down the disassembly line and a plurality of stations wherein each station is configured for removal of one or more parts of the automobile. In one embodiment, the grabber arms are configured to keep the automobile suspended throughout the entire disassembly line and can be operated by a gear assembly. In another embodiment, the entire disassembly line is electrically operated. In yet another embodiment, the weight of the disassembled parts and/or car removed at various stages of the disassembly is monitored and recorded.

In another aspect, the preferred embodiments of the present invention provide a method of disassembling automobiles. The method comprises positioning an automobile to be assembled in a suspended position, moving the automobile to a first station, removing selected parts from the automobile at the first station, weighing the automobile after the selected parts are removed, recording the weight of the automobile, and moving the automobile to a second station. In one embodiment, the method further comprises tilting the automobile at the second station such that the parts can be removed from the underside of the automobile. In certain embodiments, the fuel and fluids in the car are drained before the car is tilted.

DETAILED DESCRIPTION OF THE PREFERRED EMBODIMENT

The aforementioned needs are satisfied by certain preferred embodiments of the present invention, which provide an automobile disassembly process and system that is efficient, low maintenance, safe to operate, and designed to increase recycle rate of automobiles.

Figure 1:
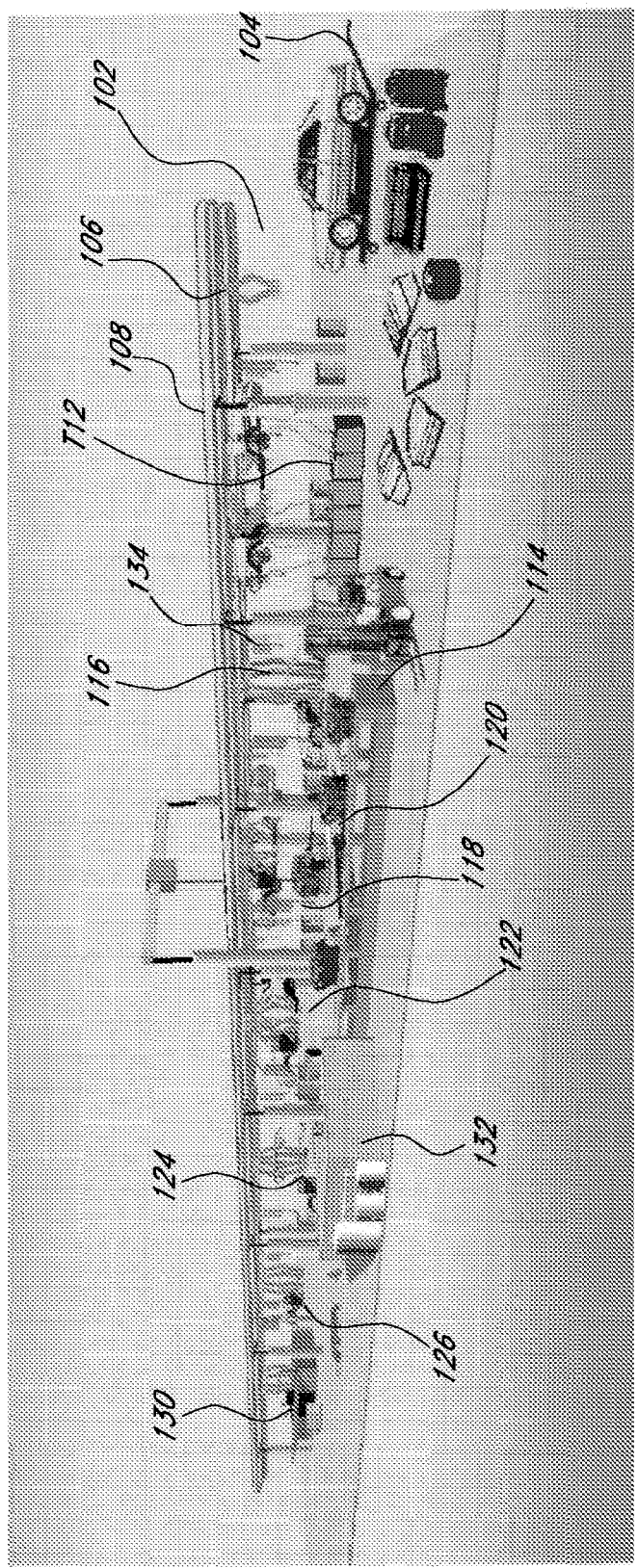
FIG. 1 is a schematic illustration of an automobile disassembly system of one preferred embodiment of the present invention.

FIG. 1 is a schematic illustration of a preferred system and process 100 for dismantling a vehicle and collecting recyclable parts therefrom. As shown in FIG. 1, the system 100 generally includes an elongated, overhead track system 108 and a plurality of grabber arms 106, 116 coupled thereto. As will be described in greater detail below, the grabber arms 106, 116 and track system 108 are configured such that an arm can travel from a starting point of the track system to an end point and then rotate back to the starting point without obstructing the movement of other arms. The disassembly line 100 also includes a plurality of stations, each having functions and features to be described in greater detail below. In some embodiments, a grating system extends across the floor space below the track system 108 so that fluids can flow past the grates and into drainage systems underneath in case of leakage. This reduces pools of fluid from forming on the floor and creating an unsafe condition.

Figure 1A:
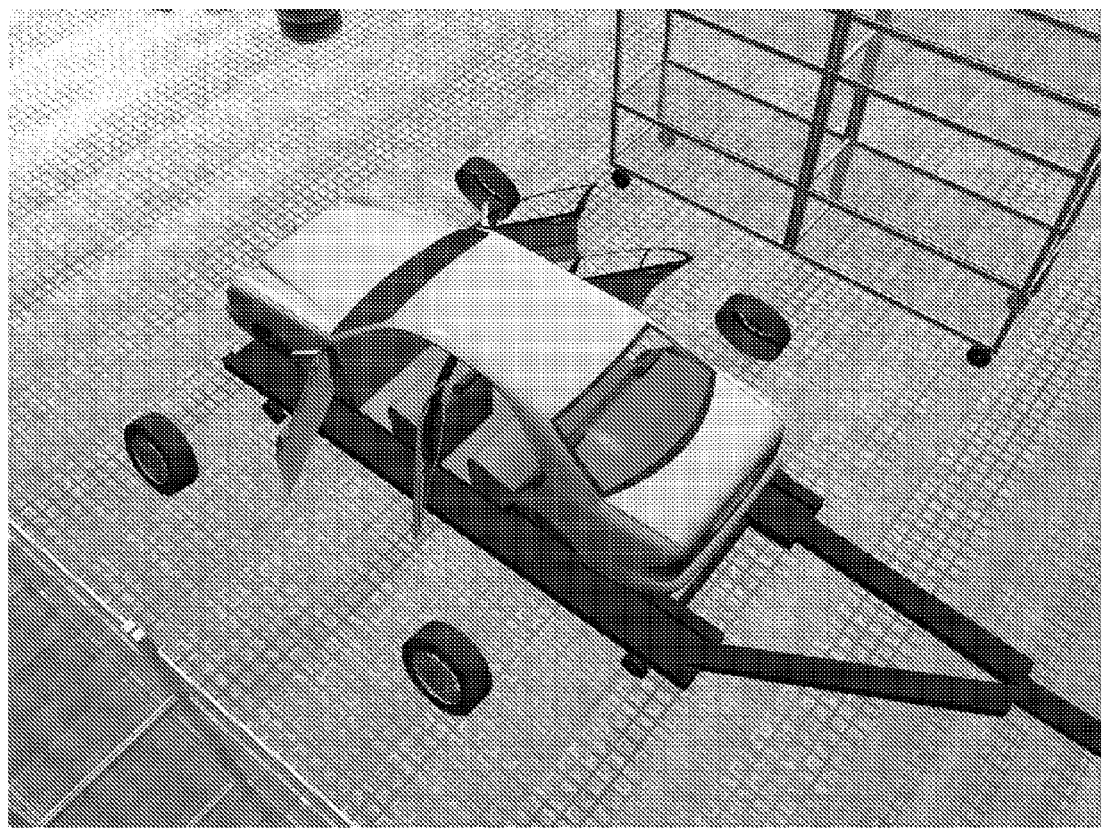
FIG. 1A shows an automobile at the entrance of the disassembly line having its tires and doors removed.

As shown in FIG. 1, the vehicle to be disassembled is first moved to a prep station 102 positioned near the entrance to the disassembly line 100. The vehicle can be moved to the prep station 102 via a transporting device such as a trolley 104 with load cell as shown in FIG. 1. Preferably, the doors, tires, wheels, and seats of the vehicle are removed from the vehicle while it is on the trolley 104a as shown in FIG. 1A. In one embodiment, the removed parts can be separated into groups and stacked at designated locations adjacent the prep station 102 for pick-up and transporting to storage, etc. Once the vehicle is in position at the prep station 102, the vehicle is lifted off the ground and suspended via a set of grabber arms 106, 116 movably mounted on the overhead track 108, which will be described in greater detail below. Preferably, one has the choice of selecting the first 106 or second set of grabber arms 116, depending on the condition and dimensions of the vehicle. For example, the first set of grabber arms 106 is generally shorter than the second set 116 and is thus designed to pick up vehicles by the roof instead of by the lower edges of the chassis. The shorter arms 106 are particularly suitable for vehicles having crushed doors or side panels, or vehicles that would be difficult to pick up by the lower edges of the chassis because of a wrecked frame. The longer arms 116 are more suitable for vehicles without damaged sides and that can be picked up by the lower edges of the chassis. As will be described in greater detail below, the set of grabber arms can be adjusted to suspend the vehicle at a height that would allow a person to work on or remove parts from the vehicle without bending.

The vehicle is moved by the grabber arms along the overhead track 108 to a fluid removal station 110, at which point various fluids such as fuel, oil, coolant are extracted from the vehicle and drained into different collection containers 112. In one embodiment, the floor of the fluid removal station and the entire disassembly line is grated such that fluids can drain to a drainage system positioned below, which reduces spills and dangers of slip and fall in case of fluid leakage. Furthermore, waste oil dripped into the drainage system can be collected and used to provide heat or generate power for the disassembly line.

After the fluids are removed, the vehicle is tilted to its side for removal of the undercarriage parts such as mufflers, fuel tanks, etc. The vehicle is then moved along the overhead track 108 to a pre-drive train removal station 114, at which point pre-drive train removal procedures are performed, which preferably include unplugging wires in preparation of drive train removal. After the pre-drive train removal step is complete, the vehicle is subsequently moved to a drive train removal station 1118, at which point the drive train of the vehicle is removed. In one embodiment, the removed drive train is placed on a conveyor system 120 extending from adjacent the vehicle to the sides of the disassembly line. The conveyor system reduces the likelihood of injury resulting from one trying to lift or carry the parts. Preferably, the conveyor system 120 is adapted to transport the heavy and cumbersome drive trains from the vehicle to locations where they can be picked up and transported by a fork truck.

As FIG. 1 further shows, the suspended vehicle is subsequently moved along the overhead conveyor 108 to a precutting station 122, at which point carpets, plastics, rubber, and other flammables are removed from the vehicle. Again, the removed parts can be separated into different groups based on their condition and usage. After the precutting station, the vehicle is then moved to a cutting station 124, at which point the vehicle is cut into sections in a known manner. In one embodiment, the vehicle is cut in a manner such that the front and rear fenders are separated from the rest of the body. Preferably, fenders that are not damaged are separated from those that will be salvaged as scrap metal. In certain embodiments, the vehicle is cut by automated saws that can be operated at a distance, such as from the side of the disassembly line. Preferably, a person can stand at a distance from the vehicle and maneuver robotic arms to cut the car, which is a safer procedure. In one embodiment, a special cutting saw is used, in which the saw is preferably counter balanced with an extended arm and a water sprinkler or mister attached.

After cutting, the suspended vehicle is moved to a pre-bailer prep station 126 at which point the remaining rubber, glass and plastics are removed from the vehicle so as to substantially minimize residue of these substances during the crushing process. In one embodiment, a rubber crumb machine is positioned at the precutting station to process the removed rubber. Following the pre-bailer prep station 126, the vehicle is moved to a crushing station 130 at which point the remaining chassis of the vehicle is substantially clean and free of all rubber and glass parts, and other residue parts before it is pressed together in a crusher for compact handling. As FIG. 1 further shows, air and vacuum hoses 134 are positioned throughout the disassembly line 100 so that they can be conveniently accessed. It will be appreciated that the height of the suspended vehicle can be adjusted and fine tuned at each station by adjusting the grabber arms in a manner to be described in greater detail below.

In certain embodiments, the system 100 further includes a water recycling system 132 in which water used in the steam washer is recycled for repeated use. In certain other embodiments, the type and quantity of removed parts from each vehicle can be entered into computer terminals positioned adjacent the disassembly line. The computers are preferably equipped with software programs capable of comparing the actual removed quantity with the expected weight of recyclable material provided by each car manufacturer. In one embodiment, the software can report, store and save scrapped vehicle data per weight per material.

Figure 2A:
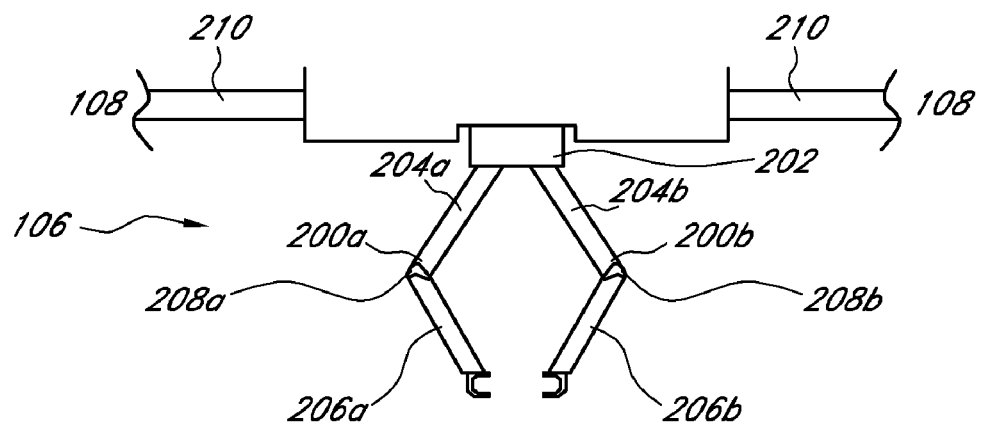
FIGS. 2A and 2B are detailed schematic illustrations of the first set of grabber arms of the automobile disassembly system of FIG. 1.

FIG. 2A is a detailed schematic illustration of the first set of grabber arms 106, which in certain preferred embodiments is the shorter set adapted to lift vehicles with crushed doors or other damages that would require the grabbers to engage with the upper roof area as opposed to the lower chassis. As shown in FIG. 2A, the grabber arms 106 comprise two elongated arms 200a, 200b extending from a common base 202. Each arm 200a, 200b has an upper portion 204a, 204b and a lower portion 206a, 206b connected together by a joint 208a, 208b. The lower portion 206a, 206b of the arm 200a, 200b can be pivoted around the joint 208a, 208b relative to its respective upper portions 204a, 204b while the upper portion 204a, 204b of each arm is pivotable relative to the base 202. These concurrent pivot actions allow the grabber arms to pick up and lift a vehicle off the ground in a similar manner as human arms pick up items. As described above, the first set of grabber arms 106 are generally shorter than the second set and is configured to lift the vehicle by grabbing the edge of the vehicle roof. As will be described in greater detail below, the base 202 of the grabber arms 106 is movably mounted to the overhead track via connecting beams 210 extending between the base 202 and the overhead track 108.

Figure 2B:
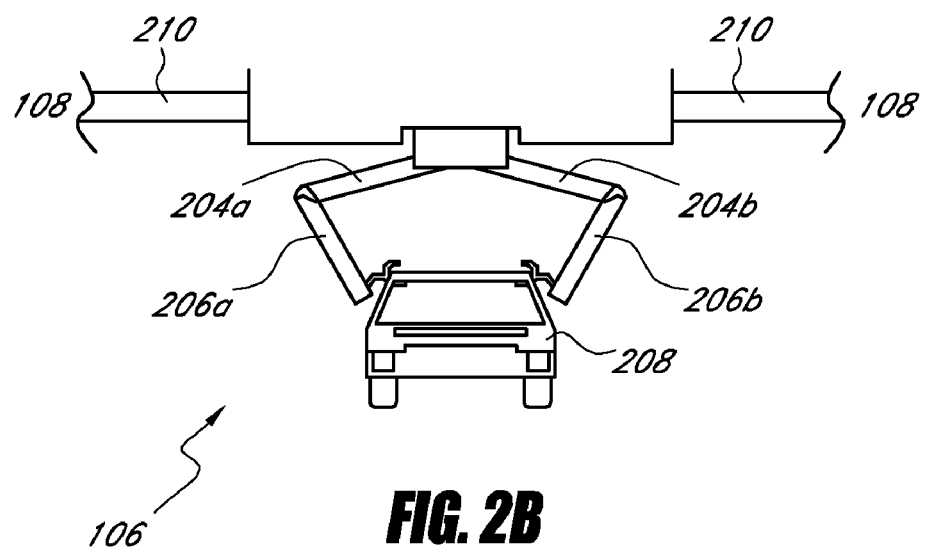

FIG. 2B shows the manner in which the lower portion 206a, 206b of each grabber arm pivots relative to the upper portion 204a, 204b while the upper portions pivot relative to the base as the grabber arms pick up a vehicle 208 by its roof. To fine tune the height of the vehicle, fine adjustments can be made to the grabber arms so that the angle between the lower and upper portions changes slightly. In one embodiment, the smallest increment of the degree of change of the angle between the lower and upper portions of each arm is about 0.1 degrees.

Figure 3:
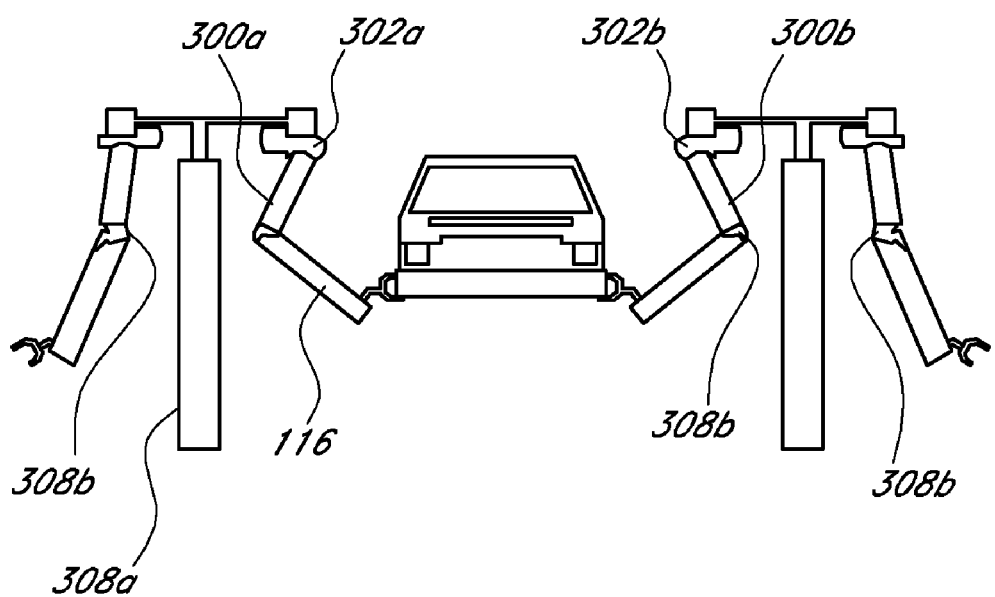
FIG. 3 is a detailed schematic illustration of the second set of grabber arms of the automobile disassembly system of FIG. 1.

FIG. 3 provides a detailed schematic illustration of the second set of grabber arms 116. As shown in FIG. 3, the grabber arms 116 comprise a plurality of arms 300a, 300b each extending from a respective base 302a, 302b. The bases 302a, 302b are movably mounted in parallel tracks as shown in FIG. 3. Similar to the first set of arms, each arm 300a, 300b has a lower portion that is pivotable relative to the upper portion about a joint 308a, 308b and each upper portion is pivotable relative to its respective base. The second set of arms are generally longer than the first set and is adapted to lift cars by the lower edge of the chassis as shown in FIG. 3. As will be described in greater detail below, the base of each arm is removably mounted to a respective track with the tracks extending parallel to each other. Moreover, the longer arms provide a larger range of movement and can accommodate cars of various dimensions.

Figure 4:
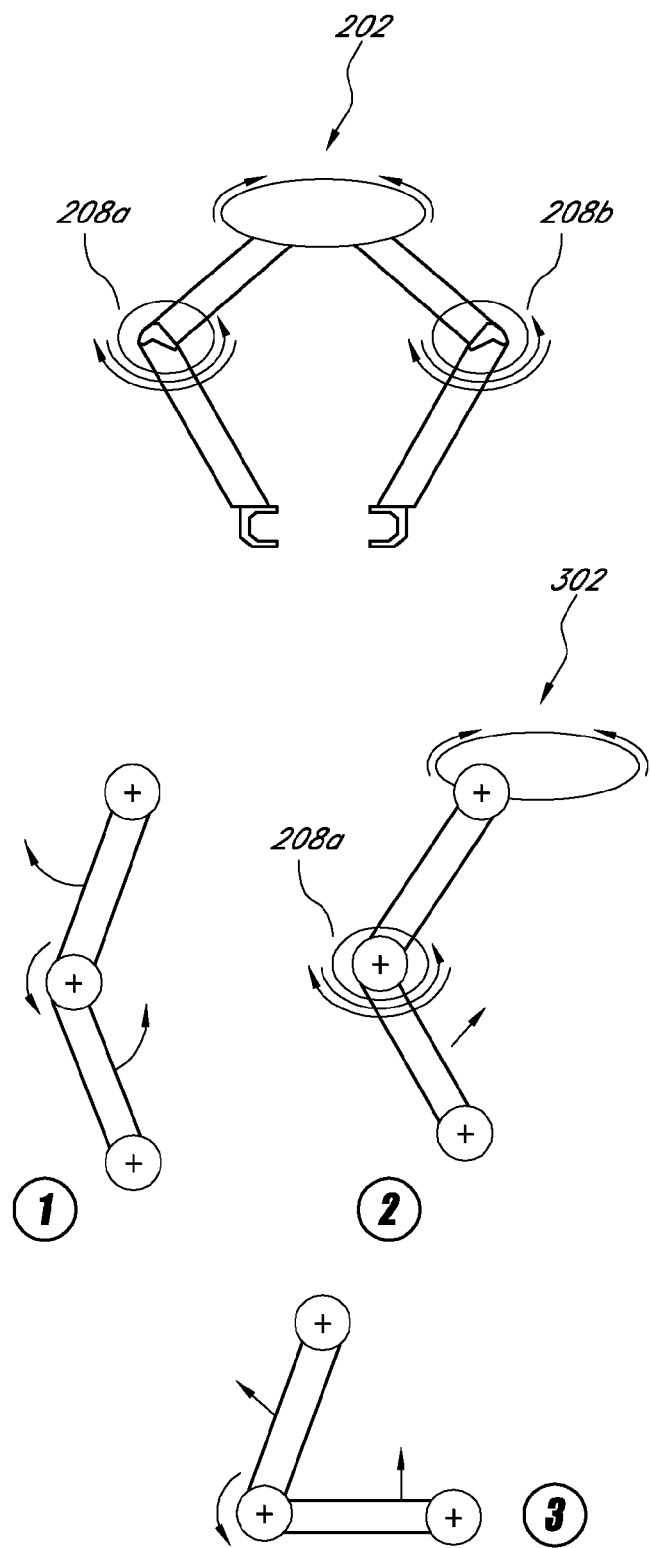
FIG. 4 provides schematic illustrations of some of the ranges of motion of the grabber arms of the automobile disassembly system of FIG. 1.

FIG. 4 provides schematic illustrations of the range of motion the grabber arms of one preferred embodiment are capable of performing. Preferably, the grabber arms are electrically operated such that all lifting motions of the vehicle are gear driven and powered by electricity and no hydraulic systems are required, which can substantially reduce leaks and other maintenance problems associated with hydraulic systems. In one embodiment, safety motion sensors are located on each set of arms to stop operation of the arm if linear motion is sensed within a pre-determined distance, which further improves safety. In one embodiment, the sensor can use a laser beam to detect motion. As such, the suspended vehicle would be unlikely to move into the next station when there is an interruption in the laser beam such as by a person or another vehicle.

As shown in FIG. 4, the upper and lower portions of each arm may be tilted at the base and/or joints. As such, the arms are capable of making panning motions, which can place the vehicle in various positions to facilitate the disassembly process. In one embodiment, cameras are mounted on the arms to assist viewing and adjustment of the arms at a remote location. Preferably, the arms can be adjusted at a remote location via a joystick controller, PC or the like. In another embodiment, control and adjustment of the arms can be automatically accomplished by integrating the camera with software and controllers that can adjustment the positions of the arms based on pre-programmed parameters and data collected from the camera.

In another embodiment, the arms are connected to weight scales adapted to measure the weight of the vehicle being suspended by the arms. Preferably, the weight of the vehicle is constantly monitored and reported to a data base. As such, one would be capable of obtaining accurate weight data of the vehicle from point of entry to the end of the disassembly line. Moreover, disassembling product weight data can be readily obtained at each stage of the disassembly process and the system can be set up to correlate the weight of a vehicle at each station and with the type of material that is being removed at each station.

Figure 5:
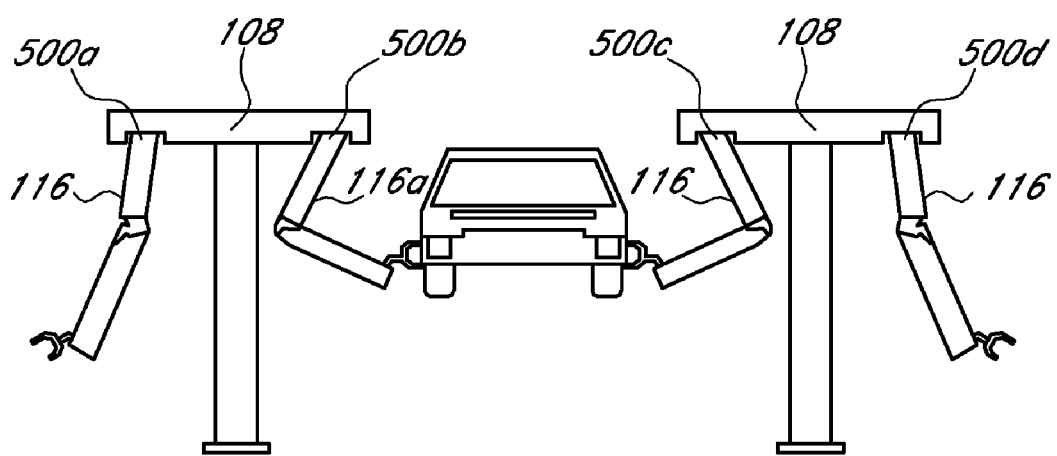
FIG. 5 is a schematic illustration of a cross sectional view of the track system of the automobile disassembly system of FIG. 1 used in conjunction with the second set of grabber arms.

FIG. 5 is a partial schematic illustration of a cross sectional view of the track system working in conjunction with the second set of the grabber arms 116. As shown in FIG. 5, the track system 108 generally comprises four substantially parallel tracks 500a-d, with each track adapted to receive the base of a grabber arm. The two inner tracks 500b, 500c are configured for the grabber arms holding the vehicle to move from the entry point of the disassembly line to the end. The two outer tracks 500a, 500d are configured for the grabber arms to move back to the entrance of the line once the vehicle has been moved to the end of the disassembly line and dismounted from the arms. This track system allows the grabber arms to continuously circulate through the system as additional cars are moved down the disassembly line.

Figure 5A:
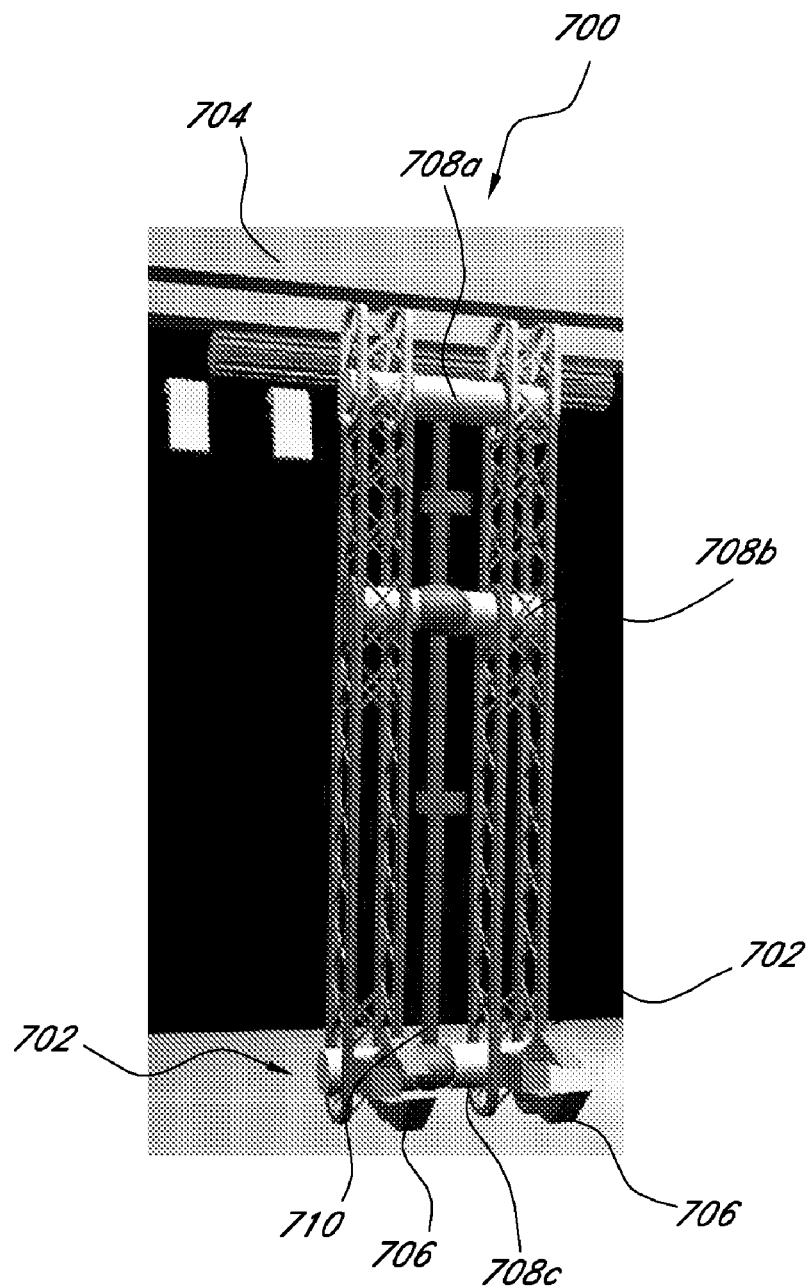
FIGS. 5A-D are schematic illustrations of a grabber arm assembly of one embodiment interconnected to a track system.

FIGS. 5A-5D are partial schematic illustrations of one embodiment of a grabber arm assembly 700 working in conjunction with a track system 704. The grabber arm assembly 700 illustrated is for the second set of grabber arms described above, which are generally longer and adapted to engage with a vehicle at the lower end of the chassis. As shown in FIG. 5A, the assembly 700 generally includes a pair of parallel elongated arms 702 extending downwardly from the track 704. A pair of grabbers 706 are positioned at a lower end of each arm 702. The assembly 700 further includes gear assemblies 708a-c positioned at joint locations on each arm 702 and can be activated to move the arms 702 and grabbers 706 in a known manner. In one embodiment as shown in FIG. 5A, each gear is interconnected to both arms 702 so that the motion of the two arms in lifting a vehicle is synchronized and/or can be moved simultaneously. In other embodiments, the system 700 further includes gear boxes containing circuits 710 used to cause the gears 708a-c to rotate in different directions and speeds in manners known in the art so as to allow the arm various ranges of motion.

Figure 5B:
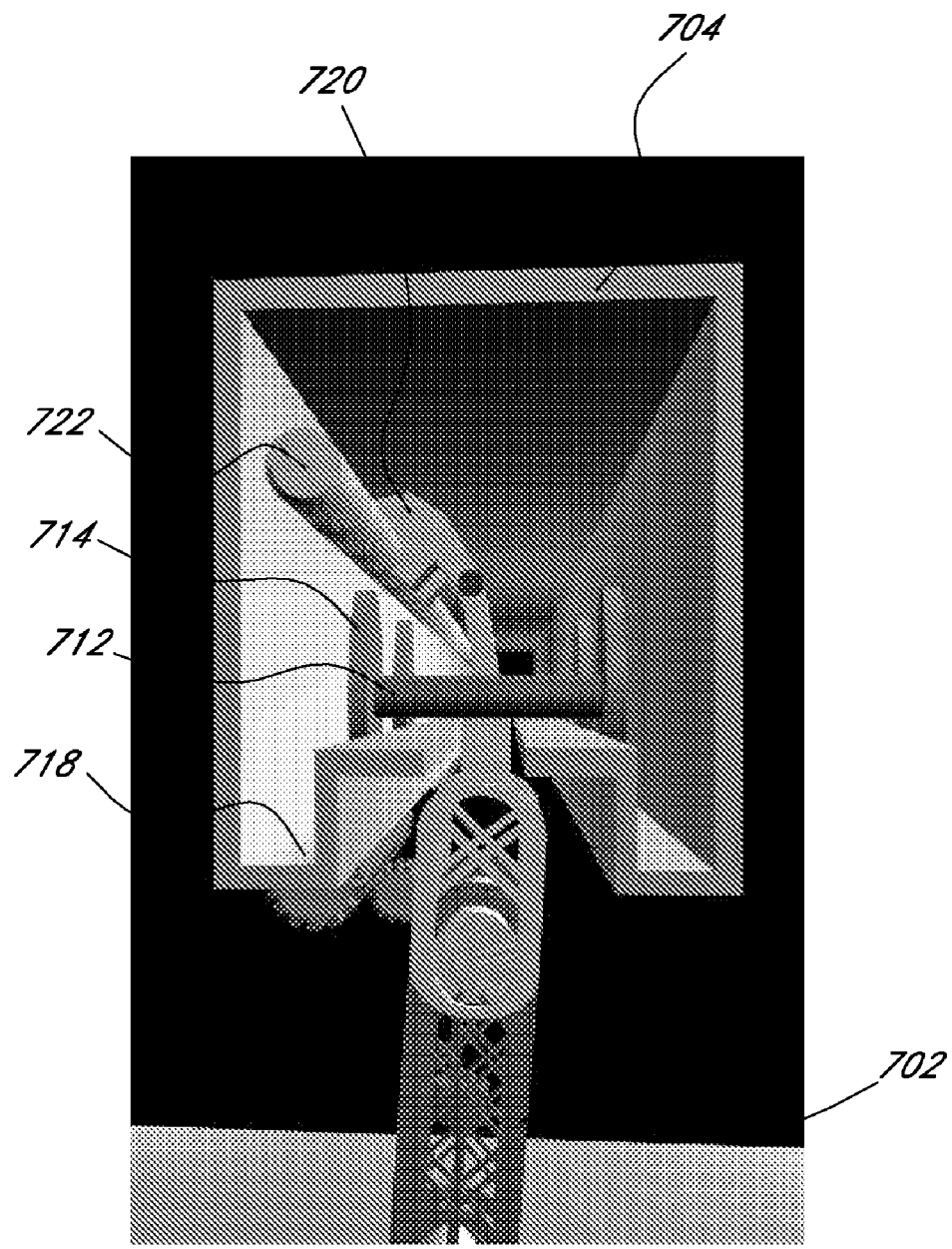

FIG. 5B illustrates an upper side view of the grabber arm assembly 700 and the manner in which it is operatively interconnected to the track system 704. As shown in FIG. 5B, the track system 704 generally includes an I-beam having a rotating screw assembly 722 extending along its length therein. Preferably, the rotating screw assembly 722 is activated by a motor and is in constant rotation. As FIG. 5B also shows, a supporting rod 712 having a wheel 714 on each end is connected to the upper ends of the grabber arms 702. The wheels 714 in turn are movably positioned inside grooves 718 formed in the track system 704. The grabber arm assembly 700 further includes a hinged arm hanger 720 which is connected to the grabber arms 702 and can be pivoted to contact the screw jack 722 extending along the track 700. As will be described in greater detail below, the rotating screw jack 722 can move the hinged arm hanger 700 forward along the track 700. The hinged arm hanger 720 being connected to the grabber arm assembly 700 will in turn move the grabber arm assembly down the track.

Figure 5C:
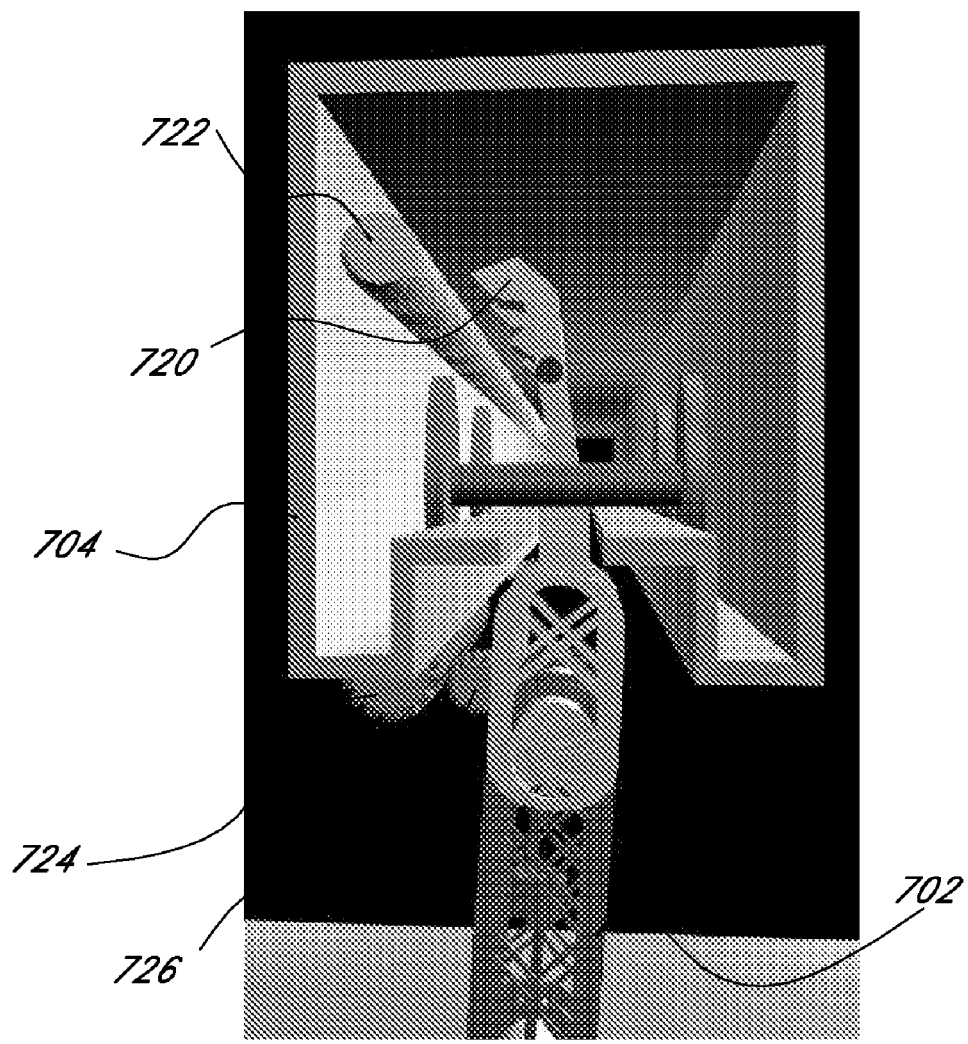
Figure 5D:
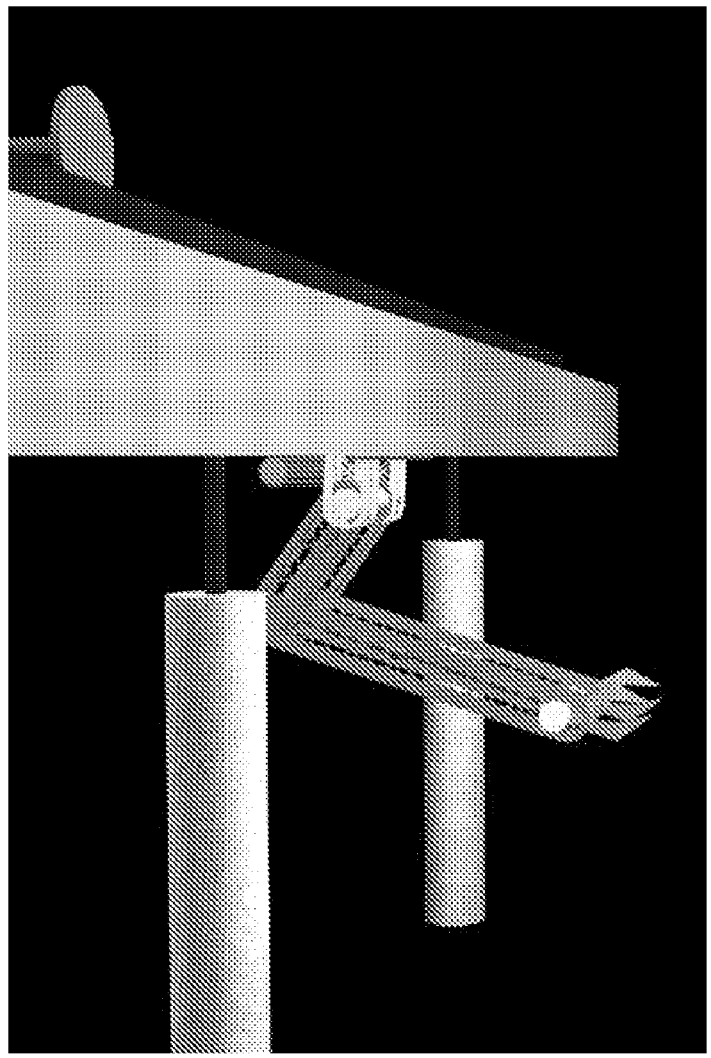

When the grabber arm assembly 700 has reached a selected station, the hinged arm hanger 720 is programmed to retract away from the rotating screw jack 722 as shown in FIG. 5C so that the grabber arm assembly will stop its linear motion and remain stationary at the particular station. Preferably, once the hinged arm hanger 720 is retracted from the rotating screw jack 722, gears are electrically activated to control the lifting movement of the grabber arms 702. As shown in FIG. 5C, a plurality of elongated gears 724, 726 are positioned below the track 704 and can be activated by a motor. Once activated, the gears 724, 726 can in turn activate the gears in the grabber arm assembly 700 in manners known in the art to enable the arms various ranges of motion to perform various lifting functions. Preferably, the gears operating the grabber arm assembly 700 can be activated only when the hinged arm hanger 720 is not in contact with the rotating screw jack 722.

Figure 6:
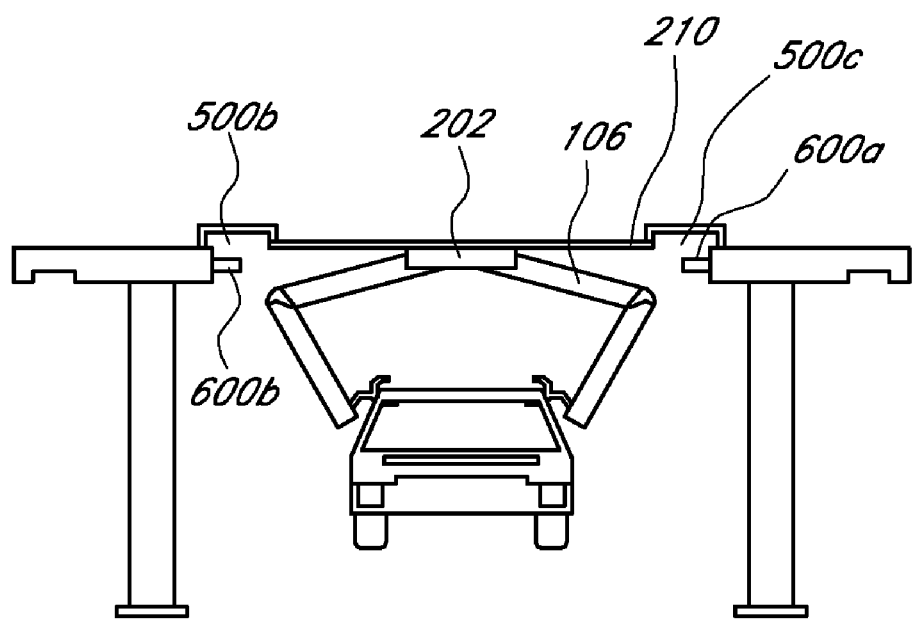
FIG. 6 is a schematic illustration of a cross sectional view of the track system of the automobile disassembly system of FIG. 1 used in conjunction with the first set of the grabber arms.

FIG. 6 is a partial schematic illustration of a cross sectional view of the track system working in conjunction with the first set of the grabber arms 106. As shown in FIG. 6, the base 202 of the grabber arm 106 is mounted on the connecting bar 210 which extends between the two inner tracks 500b, 500c. The end portions 600a, 600b of the connecting bar 210 are received in a respective track 500b, 500c such that the bar 210 can move through the tracks, thereby moving the grabber arms 106 as well. When the grabber arm assembly has reached the end of the disassembly line, a spinning mechanical arm is preferably used to push the grabber arm around and back through an adjacent track.

Figure 6A:
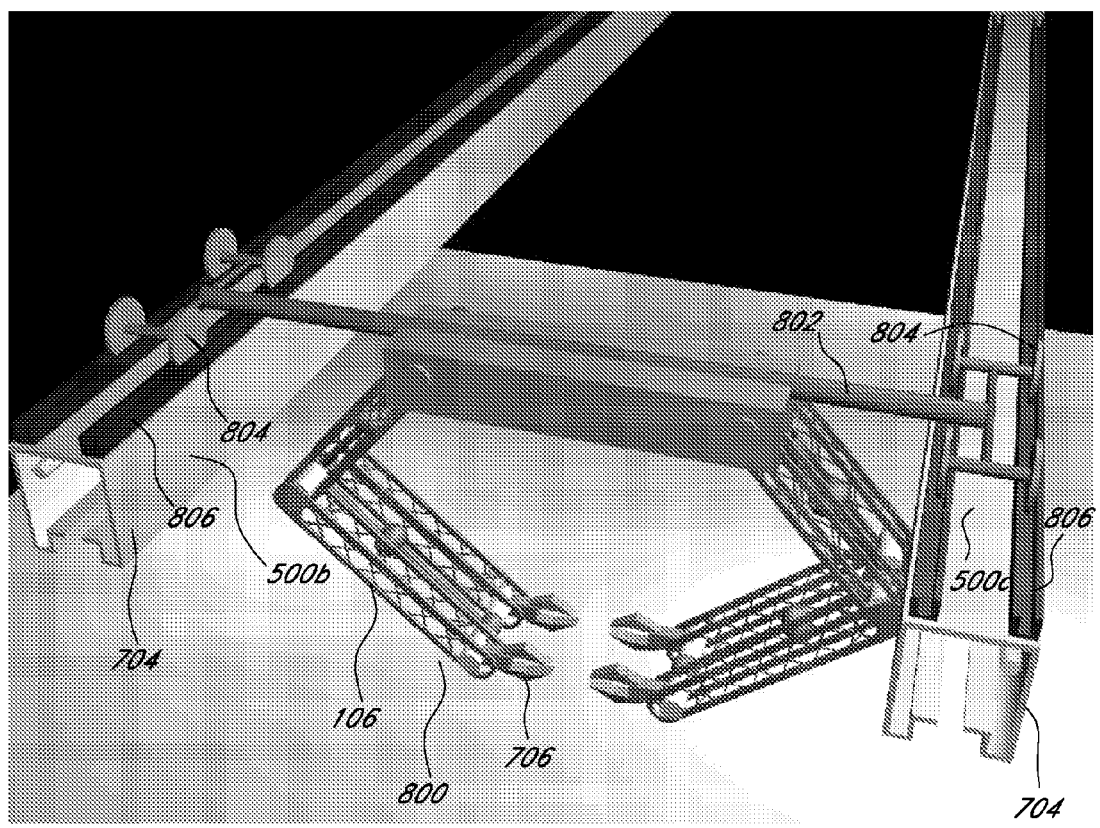
FIG. 6A-B are schematic illustrations of a grabber arm assembly of another embodiment interconnected to a track system.
Figure 6B:
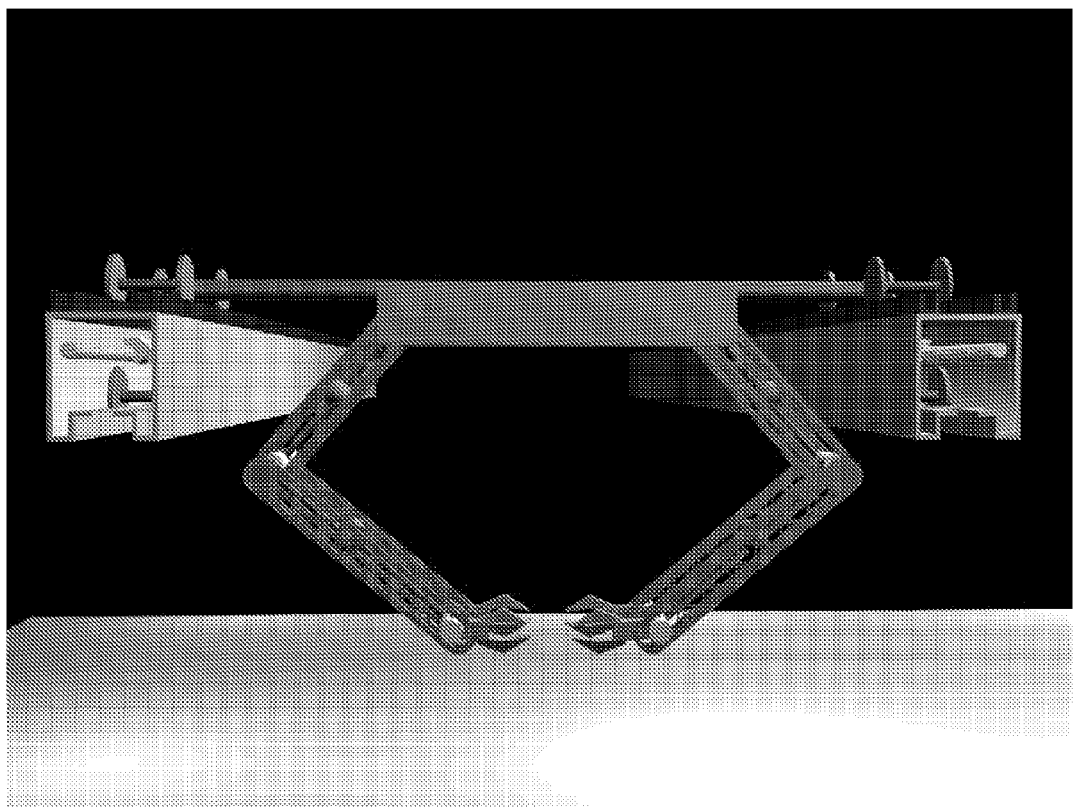

FIGS. 6A-6B are partial schematic illustrations of another embodiment of a grabber arm assembly 800, which is for the first set of grabber arms and shows the manner in which the first set of grabber arms 106 work in conjunction with the track system 500b, 500c. As shown in FIG. 6A, parallel channels 806 are formed on an upper surface of the track system 500b, 500c. The grabber arm assembly 800 is supported by the tracks 500b, 500c via a rod 802 that is attached to the grabber arm assembly 800 and connected to a plurality of wheels 804 that are received in the channels 806. Movement of the first set of grabber arms are controlled by gears and rotating screw jack similar to that described above for the second set of grabber arms. Additionally, the weight of the grabber arm assembly 800 is preferably supported by the track system 500b, 500c via the wheels.

Figure 7A:
FIG. 7A-B are schematic illustrations of portions of an automobile disassembly process of one embodiment of the present invention.
Figure 7B:
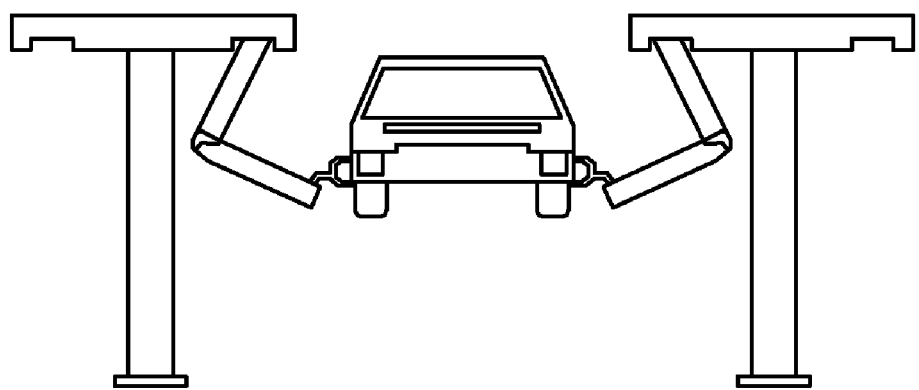
Figure 8A:
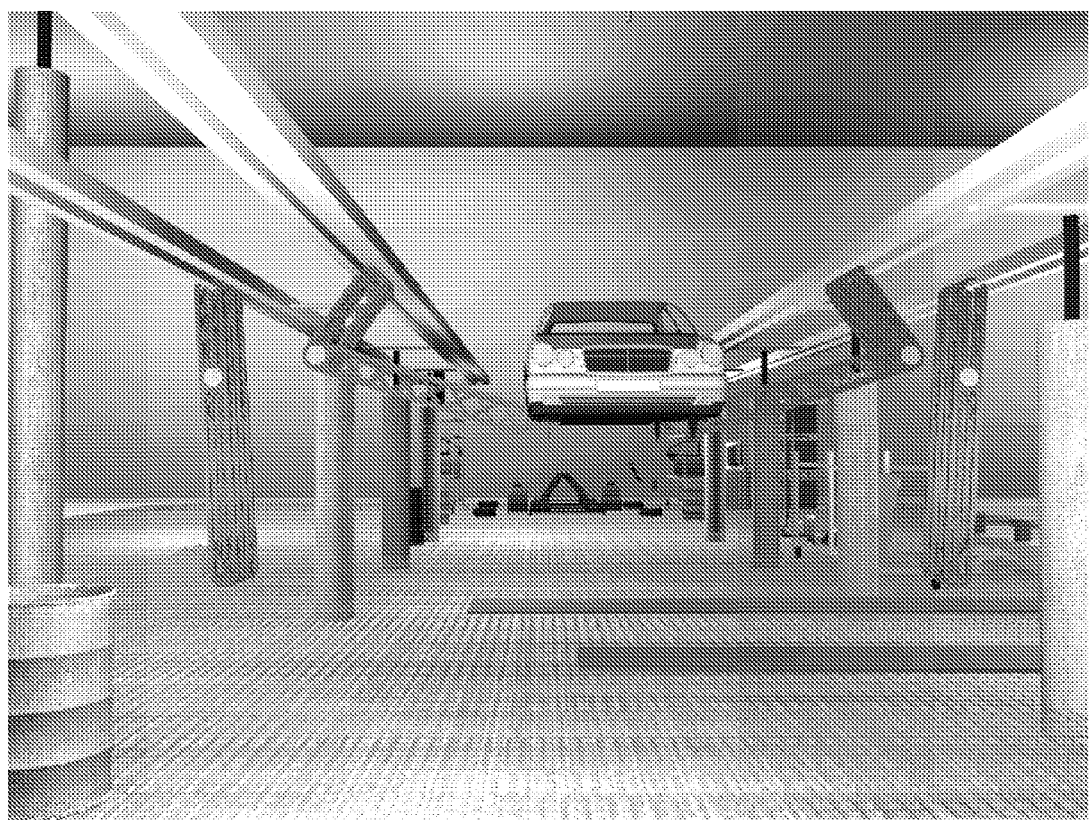
FIGS. 8A-B are schematic illustrations of the disassembly line of one preferred embodiment and the manner in which the automobiles can be maintained in a tilted position for disassembly.
Figure 8B:
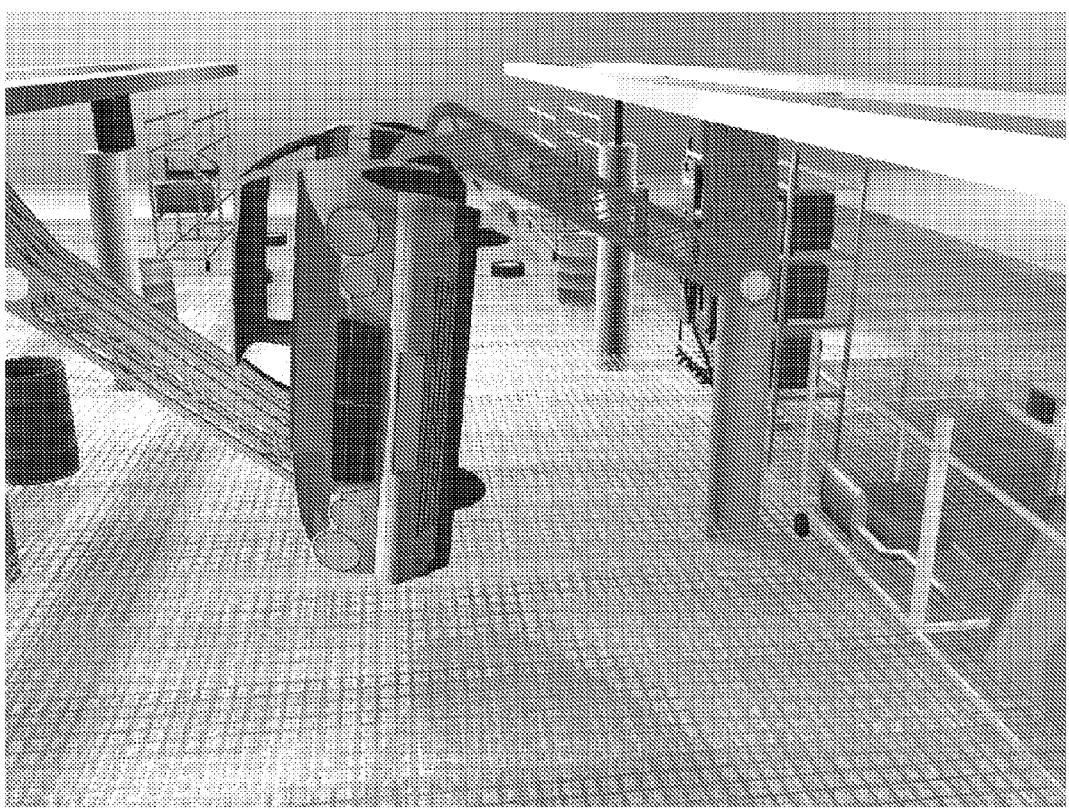

FIGS. 7A-7B show the manner in which the second set of grabber arms (longer) can be maneuvered by gears to lift a vehicle off of a trolley at the beginning of the disassembly line. FIGS. 8A and 8B illustrate the manner in which the grabber arms can be used to keep the vehicle suspended throughout the entire disassembly line in certain preferred embodiments. As shown in FIG. 8B, the grabber arms can also be maneuvered to tilt a vehicle to the side so that parts on the bottom of the vehicle can be worked on without having to remove the vehicle from the grabber arm assembly.

Advantageously, the disassembly system and process of the preferred embodiments provide a safe, clean and efficient way to disassemble an automobile and collect recyclable parts. In particular, the system utilizes a novel lifting system that provides a wide range of motion. Moreover, once the vehicle is suspended by the grabber arms, it is moved through the disassembly line without requiring much human handling. The vehicles are suspended at all times and the height of the vehicle can be automatically adjusted to a desired level for particular dismantling operations. Moreover, the weight of the crushed car is reduced with more components effectively removed, which in turn reduces the transportation cost of the crushed chassis and amount of fluff or residue to land fill. Furthermore, it is a centralized indoor environment that is laid out to be motion efficient. In certain implementations, this system is generally suitable for all robotic removal of parts.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions.

What is claimed is:

1. A method of disassembling an automobile using a disassembly line comprising at least two sets of grabber arms, comprising:
    selecting a first set of grabber arms to suspend the automobile, said first set of grabber arms is selected based on the condition and dimension of the automobile;
    suspending an automobile to be disassembled with the first set of grabber arms;
    adjusting the first set of grabber arms in a manner such that the automobile is suspended at a height that would allow a person to work on or remove parts from the automobile;
    moving the automobile to a first station by moving the first set of grabber arms;
    removing selected parts from the automobile at the first station while the automobile remains suspended;
    weighing the automobile while the automobile remains suspended after the selected parts are removed;
    recording the weight of the automobile; and
    moving the automobile to a second station.

2. The method of claim 1, further comprising using the first set of grabber arms to tilt the automobile at the second station so that parts from the underside of the automobile can be removed.

3. The method of claim 1, wherein the the first set of grabber arms is shorter than a second set of grabber arms.

4. The method of claim 1, wherein the automobile is moved to the first station by the first set of grabber arms working in conjunction with a first track having a rotating screw assembly.

5. The method of claim 1, wherein the first set of grabber arms is adapted to lift the automobile by grabbing the edge of the automobile roof.

6. The method of claim 1, wherein weighing the automobile after the selected parts are removed comprising weighing the automobile using weight scales that are connected to the first set of grabber arms.

7. The method of claim 1, further comprising dismounting the automobile at the end of the disassembly line and moving the first set of grabber arms along a second set of tracks to the entrance of the disassembly line.

* * * * *